(12) United States Patent
Køhler (10) Patent No.: US 9,726,141 B2
(45) Date of Patent: Aug. 8, 2017

(54) WAVE ENERGY ABSORPTION UNIT

(75) Inventor: Anders Køhler, Søborg (DK)

(73) Assignee: Floating Power Plant A/S, København Ø (DK)

( * ) Notice: Subject to any disclaimer, the term of this patent is extended or adjusted under 35 U.S.C. 154(b) by 678 days.

(21) Appl. No.: 14/232,083

(22) PCT Filed: Jul. 4, 2012

(86) PCT No.: PCT/DK2012/050247
§ 371 (c)(1),
(2), (4) Date: Jan. 10, 2014

(87) PCT Pub. No.: WO2013/007259
PCT Pub. Date: Jan. 17, 2013

(65) Prior Publication Data
US 2014/0165550 A1    Jun. 19, 2014

(30) Foreign Application Priority Data
Jul. 13, 2011  (EP) ..................................... 11173843

(51) Int. Cl.
*F03B 13/18*  (2006.01)

(52) U.S. Cl.
CPC ........ *F03B 13/1815* (2013.01); *F03B 13/182* (2013.01); *Y02E 10/38* (2013.01)

(58) Field of Classification Search
CPC ..... F03B 13/1815; F03B 13/182; Y02E 10/38
USPC .......................................... 60/499, 506, 722
See application file for complete search history.

(56) References Cited

U.S. PATENT DOCUMENTS

| 918,870 A | 4/1909 | Lawrence |
| 4,210,821 A * | 7/1980 | Cockerell ............... F03B 13/20 290/53 |
| 4,332,506 A | 6/1982 | Andrews |
| 2010/0111609 A1* | 5/2010 | Espedal ............... F03B 13/182 405/76 |

FOREIGN PATENT DOCUMENTS

| DE | 2812495 | 9/1979 |
| DK | 174463 | 3/2003 |
| FR | 2473120 | 7/1981 |
| WO | WO2004097212 | 4/2004 |
| WO | WO2004097212 | 11/2004 |
| WO | WO2008111849 | 9/2008 |

* cited by examiner

Primary Examiner — Mark Laurenzi
Assistant Examiner — Kelsey Stanek
(74) Attorney, Agent, or Firm — Nixon Peabody LLP (57) ABSTRACT

A wave absorber element of the front pivot type for the absorption of wave energy from water has a front end comprising a front pivot axis around which the absorber element swings under operation, and an absorber element body substantially defined by a front side extending from the front end to a lower rear edge, a rear side extending from an upper rear edge to the lower rear edge, a top side extending from the front end to the upper rear edge, and lateral sidewalls defining the width of the absorber body in an axial direction parallel to the front pivot axis. The lower rear edge is located in a first radial direction from the pivot axis, the upper rear edge is located in a second radial direction from the pivot axis, and the first and second radial directions define an acute tip angle (alpha) of the absorber element.

32 Claims, 6 Drawing Sheets

WAVE ENERGY ABSORPTION UNIT

CROSS-REFERENCE TO RELATED APPLICATIONS

This application is a U.S. National Stage of International Application No. PCT/DK2012/050247, filed Jul. 4, 2012, which claims the benefit of European Patent Application No. 11173843.1, filed Jul. 13, 2011, both of which are incorporated herein by reference in their entireties.

TECHNICAL FIELD

The invention relates to an absorber unit comprising a wave absorber element of the front pivot type for the absorption of wave energy from a body of water.

In a further aspect, the invention relates to a method of providing an absorber unit comprising a wave absorber element of the front pivot type for the absorption of wave energy from a body of water, wherein the method comprises configuring the absorber element for operation in a wave climate at a given deployment site.

BACKGROUND

In the recent decades, increased focus has been directed to the exploitation of renewable energy sources.

Wave energy is a renewable energy resource that for one part may be created by large storms hundreds of kilometers offshore that generate and transmit huge amounts of energy that travels great distances via swell, and for another part may be created by local influences, such as local seas that are generated by local winds. Wave energy is a genuinely renewable energy source and distinct from tidal energy. Wave energy plants can be configured to exploit wave energy stemming from both remotely generated swell and local seas.

Wave energy as a renewable energy source has a number of advantages. One advantage is the high power density of wave energy that suggests it has the capacity to become the lowest cost renewable energy source. A further advantage is the predictability of wave energy: unlike solar and wind, wave energy levels can be predicted many days in advance, making it less challenging to integrate wave energy with national power supplies.

However, while being predictable, the waves carrying that energy are typically highly irregular, wherein the wave climate at a given location observed over a certain period of time, e.g. over one year, comprises a statistical distribution of wavelengths, heights and directions. Depending on the local conditions of a deployment site of a wave energy plant, the observed waves may be the result of a superposition from a number of different sources. The resulting wave fields may vary from essentially parallel wave fronts coming from a well-defined direction (referred to as 2D-waves), to being highly complex with numerous different directional components (referred to as 3D-waves).

Furthermore, marine environments are particularly harsh environments, where a need for frequent maintenance and repair can seriously affect the operational up-time of the wave energy plant for energy production.

A major challenge of the exploitation of wave energy is therefore to maximize energy production year round, including increasing the efficiency of the energy absorption, harvesting energy under varying wave conditions, maximizing production up-time of a wave energy plant and producing useful energy at a competitive cost level.

A wave energy plant using absorbers of the front pivot type is disclosed in DK 174 463 B1 where a plurality of front pivot absorber elements are pivotally attached to a submerged platform to swing around a horizontal pivot axis arranged at the front of the absorber element. Under operation, incoming waves travel from the front end towards a rear end of the absorber element interacting with it to absorb both kinetic and potential energy from the waves. The resulting motion of the absorber element with respect to the platform frame is exploited by a hydraulic power take-off system. The disclosed absorber element comprises a floating body with a closed top and an open bottom and may further be divided into cells with perforated walls acting as a flow resistance for water flowing into and out of the floating body so as to improve the wave tracking properties of the absorber. However, no further indications are given on how to provide and configure an absorber that is efficient over a broad wave spectrum as required for practical applications.

DISCLOSURE OF THE INVENTION

One object of the present invention is therefore to provide an absorber element of the front pivot type, the absorber element allowing for the efficient absorption of wave energy in irregular waves and under varying wave conditions.

According to one aspect, the object is achieved by an absorber element according to claim 1. In a further aspect, the object is achieved by a method of providing an absorber element according to claim 10.

According to one aspect, the object is achieved by a wave absorber element of the front pivot type for the absorption of wave energy from a body of water, the absorber element having a front end comprising a front pivot axis around which the absorber element swings under operation, and an absorber element body being substantially defined by a front side extending from the front end to a lower rear edge, a rear side extending from an upper rear edge to the lower rear edge, a top side extending from the front end to the upper rear edge, and lateral sidewalls defining the width of the absorber body in an axial direction parallel to the front pivot axis, wherein the lower rear edge is located in a first radial direction at a first distance from the pivot axis, and the upper rear edge is located in a second radial direction at a second distance from the pivot axis, wherein the first and second radial directions define an acute tip angle of the absorber element, wherein the first distance defines the absorber element length, and the distance of the upper rear edge from the first radial direction defines the absorber element height, the absorber element having a cross-sectional profile as seen in a cut-plane perpendicular to the front pivot axis, wherein said absorber element profile encloses a profile of the absorber element body and the front pivot axis, wherein the absorber element profile at the front side comprises a concave portion as seen in a direction from the front end to the rear end.

The term "vertical" refers to a direction parallel to gravity and the term "horizontal" refers to directions perpendicular thereto. The terms "top" and "bottom" of the absorber are defined with respect to the position of the absorber when in use or at least when deployed in a body of water, wherein an "upward" direction from the bottom towards the top points out of the water and a "downward" direction points from the top towards the bottom into the water. The terms "front" and "rear" of the absorber are defined with respect to the position of the absorber when in use, wherein the direction of wave propagation is from the front end pointing towards the incoming waves to the rear end pointing away from the incoming waves. The term "front" refers to the end of the absorber element, which, under operation, points towards the direction from which the waves are coming, whereas the absorber element body floats "down-stream" of the pivot axis with regard to the direction of wave propagation. An absorber element of the front pivot type is thus an element, which is configured to be pivotally supported for rotary motion around a pivot axis arranged at the front end, i.e. "upstream" with respect to the direction of propagation of the waves, the actual body of the absorber element being arranged aft of the pivot axis, i.e. the rear end of the absorber element is arranged "downstream" with respect to the direction of propagation of the waves. The front pivot axis is arranged in an essentially horizontal direction allowing the front pivot type absorber element to reciprocate up and down in a rotary motion of the absorber element body around its front pivot axis, thereby absorbing kinetic and potential energy from the waves driving the motion. The reciprocating motion of the absorber element body is performed aft of the front pivot axis with respect to the propagation direction of the waves.

The absorber element is operated in an absorber unit comprising a frame pivotally supporting the absorber element from the front pivot axis at a given pivot axis height above the body of water. The front pivot axis is on the one hand chosen sufficiently close to the water surface to allow for an efficient interaction of the absorber element with the incoming waves, and on the other hand sufficiently high above the water surface to avoid loss of energy due to submersion of the top side and/or due to wave impact on the absorber unit thus interacting with the frame instead of transferring the energy to the absorber element. Continuing direct wave impact on the absorber unit structure and the front pivot axis may cause excessive wear or even damage the absorber unit. The absorber unit's frame may be part of a floating platform that is moored to the sea floor or may be immobilised by means of a foundation fixed to the sea floor. Preferably, the absorber unit is rotatable about a vertical axis, e.g. by means of a rotatable mooring system, so as to be able to align the absorber unit with the prevalent direction of propagation of the incoming waves. When used in a wave energy plant, the reciprocating motion of the absorber element is harnessed by a power take-off system comprising conversion means for converting the harnessed energy into a desired form of useful energy, such as an electrical generator.

An idle position of the absorber may be defined with respect to the body of water under still water conditions, wherein an average level of the surface of the body of water defines a still water reference. Distances from the still water reference in a direction normal to the surface and out of the body of water may be referred to as height above still water, whereas distances from the still water reference in a direction normal to the surface and into the body of water may be referred to as depth below still water. In its idle position, the absorber element is configured to be suspended from the front axis at a predetermined axis height above still water, and is partially submerged. The front pivot axis height is thus the height of the front pivot axis above still water. An idle draught of the absorber element is defined by the depth below still water of the absorber element's submerged lower rear edge. Typically, a principal portion of the absorber element is under water with only a minor top portion of the absorber element sticking out of the water.

The front side surface faces towards the incoming waves thus forming the pressure side of the absorber element. The rear surface faces away from the incoming waves thus forming the wake side of the absorber element. The front side forming the pressure surface for interaction with the incoming waves extends from the front end to the bottom of the rear end of the absorber element. The front side length is the distance of the lower rear edge from the front pivot axis, i.e. equal to the first distance. The front side inclination under idle conditions is the angle of the first radial direction with respect to the still water level. An absorber element operating angle may be defined as the angle of the first radial direction with respect to the still water level. An absorber element top side angle may be defined as the angle of the second radial direction with respect to the still water level and is equal to the difference between front side inclination and the tip angle of the absorber element.

The length of the absorber element is measured from the front end to the rear end in a direction parallel to the first direction, perpendicular to the pivot axis. The height is measured from top to bottom in a direction perpendicular to the first direction and in a plane perpendicular to the pivot axis. The width of the absorber refers to the overall width of the absorber element body as measured in an axial direction, i.e. parallel to the pivot axis. A cross-section taken in a plane perpendicular to the pivot axis may be referred to as the profile of the absorber element.

Providing the front side of the profile of the absorber element with a concave portion improves capture of and interaction with the waves rolling in towards the absorber element, thereby increasing the efficiency of absorption.

As mentioned above, a principal portion of the absorber element's body is typically submerged so as to interact not only with the waves at the surface, but also to capture energy from the wave induced recirculating motion of the water particles deep below the surface. Typically, the absorber is submerged up to a level close to the top. The top side of the absorber element typically projects out of the water. Also during operation, it is preferably avoided that the top side is submerged—apart from spill over that may commonly occur in high waves or under conditions of extreme swell or storm.

The submerged portion of the absorber element yields buoyancy to the absorber element. The buoyancy provides a lifting force in an upward direction, which in the rising phase of a wave lifts the absorber element to swing around the front pivot axis in an upward direction. Furthermore, the submerged portion of the front side provides a pressure surface of the absorber element extending from the pivot axis downward into the water where it interacts with the incident wave to absorb kinetic energy of the wave. The rising wave thus accelerates the absorber element in an upward direction to an upper turning point, thereby absorbing both potential energy and kinetic energy from the wave. As the wave falls again, the absorber element recovers from the upper turning point to a lower turning point mainly under the influence of gravity, assisted by further downward acting forces, such as adhesion of the outer surfaces of the absorber element to the retracting body of water. Driven by a subsequent wave, the absorber element rises again from the lower turning point to the upper turning point. Thereby, the incident wave field transfers a substantial portion of its energy to the absorber by driving the reciprocating motion of the absorber element with respect to the absorber unit's frame. This energy may be harnessed by means of a power take-off means driving electrical generator means for converting the absorber motion into useful electrical energy. The power take-off means may e.g. be a hydraulic system comprising pumps mounted between the absorber element and the absorber unit frame, wherein the pumps are used to generate a pressure for driving a hydraulic turbine. Alternatively, the power take-off system may be a direct energy conversion system, wherein the mechanical motion of the absorber element is converted mechanically and linked to directly drive the input shaft of an electrical generator. Alternatively or in addition to converting the absorber element motion into useful energy, such as electrical energy, the absorber may also be used in a break water system. By absorbing a substantial portion of the energy of incoming waves over a broad spectral range, the absorber element acts as efficient break water for calming/protecting the waters located aft of the absorber.

As further detailed below, preferably the absorber element is configured according to the wave climate prevalent at a given deployment site at which the absorber element is to be operated.

Further, according to one embodiment of the invention, a front side portion of the convex envelope to the absorber element profile is a straight line extending from the front end to the lower rear edge. The convex envelope to a shape may be visualized as the contour defined by a rubber band stretched around the shape. A concave portion of the contour of the shape means a portion bulging away from the convex envelope in an inward direction. In the region of the concave portion, the convex envelope to the shape is a straight line. A profile of the absorber element includes both the front pivot axis and the profile to the body of the absorber element. Providing an absorber element that has a convex envelope with a straight line extending from the front end to the lower rear edge means the front side bulges inwardly and away from the first direction to form a generally concave pressure surface for capturing the incoming waves. By this configuration, an efficient absorption is achieved.

Advantageously, the absorber element profile is at the front side provided with a substantial concave portion, i.e. a major portion of the front side portion of the absorber element profile deviates from the straight line bulging inwardly with respect to the convex envelope to the absorber element profile. Thereby, the cross-sectional area of the absorber element enclosed by the absorber element profile is reduced as compared to the area enclosed by the convex envelope to the absorber element profile. Advantageously, the difference in area is at least 10%, alternatively at least 20%, alternatively at least 30%, said difference being attributed to the front side of the absorber element profile deviating from the straight line extending from the front end to the lower rear edge.

By the concavely shaped front side surface absorption efficiency is increased as compared to a planar front side surface that essentially follows a straight line from the front end to the rear end. Furthermore, by using a concavely shaped front side, buoyancy of the absorber element may be distributed in such a way that the concave front side reaches deeper into the water than for an absorber element with the same given/desired buoyancy and different shape, such as an absorber element with a flat front side or an absorber element that is configured as a wave follower essentially riding on top of the waves, i.e. following the wave induced movement of the uppermost portion of the body of water. By reaching deeper into the water than other shapes, a larger portion of the energy carried by the waves may be absorbed/harvested.

Further, according to one embodiment of the invention, the concave portion at the front side of the profile comprises at least two adjacent concave sub-portions separated by a ridge. By structuring a concave front side surface into sub-portions, the efficiency can be further enhanced. Furthermore, the front side may be further shape-optimized for interaction with different wave conditions, such as very deep waters at off-shore deployment sites or more shallow waters close to a shore or bank.

Advantageously, according to one embodiment, the concave sub-portions are arranged in a radial direction in extension of each other, wherein a first, proximal sub-portion is located close to the pivot axis and one or more further sub-portions are placed distally thereto in a direction towards the rear end.

Further, according to one embodiment of the invention, one or more, preferably all, of the concave sub-portions follow essentially circular arcs.

Further, according to one embodiment of the invention, the rear side portion of the profile follows a circular arc around the front pivot axis. The circular rear end of the profile minimizes wave generation aft of the absorber when the absorber element moves up and down in the body of water. Thereby loss due to wake generation is avoided or at least reduced.

Advantageously, the dimensions of the absorber element may be selected from the following ranges of dimensions in order to provide efficient absorbers for a large number of potential deployment sites. Upper limits for length and height are typically given in view of the complexity and the elevated construction cost associated with excessively large absorber elements and the frame structures required for supporting and operating such large absorber elements. Lower limits for length and height are typically given with regard to a minimum size and frequency of waves in order to be relevant for exploitation.

Further, according to one embodiment of the invention, the absorber element length is in the range from 5-50 m, alternatively in the range from 10-40 m.

Further, according to one embodiment of the invention, the minimum absorber element height is 2 m, alternatively 3 m, or alternatively 4 m, and wherein the maximum absorber element height is 30 m, alternatively 20 m, or alternatively 10 m.

Further, according to one embodiment of the invention, the tip angle is between 10-70 degrees, alternatively between 20-60 degrees, preferably between 25-50 degrees. An advantageous value for the tip angle, and accordingly for an associated length to height ratio, is preferably determined according to the wave conditions under which the absorber element predominantly is operated. Long period shallow waves, e.g. in shallow waters, may require a very small tip angle, whereas high amplitude waves coming in with a high frequency may require a relatively short wave absorber with a large tip angle.

Advantageously, according to one embodiment, the absorber element has a tip angle alpha of about 30 degrees, and a length to height ratio of about 2.

Further, according to one embodiment of the invention, the absorber element comprises one or more interior hollow spaces for ballasting the absorber element. Providing interior hollow spaces for ballasting the absorber element allows for trimming the draught of the absorber element at rest by controlling its total weight. Different configurations can be conceived. By placing the same ballast in a different ballast tank located at a larger distance from the front pivot axis, the draught may be increased. Furthermore, subdividing the interior hollow spaces into a plurality of separate ballasting tanks arranged adjacent to each other in a radial direction also allows for adjusting the moment of inertia of the absorber element, i.e. controlling the absorber element's inertia for rotational motion around the front pivot axis, e.g. for a given total weight.

According to a further aspect, a method of providing a wave absorber element according to any of the above-mentioned embodiments comprises configuring the absorber element for operation in a wave climate at a given deployment site, the configuration comprising the steps of
  obtaining statistical wave data describing the wave climate of the deployment site,
  deriving from the statistical wave data one or more characteristic parameters that are representative of the wave climate, the characteristic parameters comprising a characteristic wave height H and/or a characteristic wave period T, and
  dimensioning the absorber element according to the one or more characteristic parameters, so as to optimise productivity for conversion of available wave energy to useful energy when operating the absorber element in the wave climate of the given deployment site, wherein an idle draught Fd of the absorber element is dimensioned to be larger than the characteristic wave height, said idle draught being defined under still water conditions as the depth of submersion of the lower rear edge below still water level when pivotally suspending the absorber element from the front axis at a predetermined axis height Fa above said still water level, and/or the length Fl of the absorber element is chosen to be smaller than a characteristic wavelength corresponding to the characteristic wave period.

The irregular nature of waves in realistic applications, such as those mentioned above, requires a high level of efficiency over a broad range of sea-states. In order to fulfil these requirements, the absorber element is configured according to the wave climate prevalent at a given deployment site. Advantageously, the geometry of the absorber element is therefore configured in terms of characteristic values representative of that wave climate. The wave climate may be derived from wave data of that deployment site, such as statistical data on the wave height, wavelength and wave directions.

A given sea-state may be described as a superposition of wave components, wherein a sea-state of irregular waves with an arbitrary directional spread may be described in terms of the occurrence of regular wave components throughout a given observation period. The distribution of the energy content over these regular wave components may be summarised in an irregular wave spectrum describing the sea-state of irregular waves. Throughout the present application, the term "wave spectrum" refers to a distribution representing a sea-state of irregular waves. The spectral distribution of the wave components in the (irregular) wave spectrum may be characterised by key figures, such as the wave energy period Te, a peak wave period Tp, a mean zero-crossing period Tz, and/or a significant wave height Hs. Te, Tz, and Hs may be defined in terms of the frequency moments mn of the wave spectrum:

$$m_n = \sum_{i=1}^{N} S_i f_i^n \Delta f_i$$

with $$T_e = \frac{m_{-1}}{m_0},$$

$$T_z = \sqrt{\frac{m_0}{m_2}}, \text{ and}$$

$$H_s = 4\sqrt{m_0}.$$

The peak wave period Tp may be defined as the wave period where the wave spectrum exhibits a maximum. A wave period may be associated with a corresponding wavelength being the length, which the wave travels within the wave period. The wavelength λ is approximately $$\lambda = \frac{gT^2}{2\pi},$$

wherein g is the gravitational constant, and T is the appropriate wave period.

Wave data may be gathered from several sources, which are often combined. Examples for wave data sources comprise: Direct measurements, Acoustic Doppler Current Profiling (ADCP), buoys, etc.; Direct Measures from land, radar, etc.; Conversion of wind data to site wave data; Global and/or local wave and weather models. If necessary, these data are adjusted to the specific site characteristics. For example, if the data are not measured precisely at the site they must be adjusted to the site in regards to water depths and other site specific conditions. Thereby, a pool of site specific wave climate data is created and may be archived.

The statistical distribution of the sea states year round may be analysed in terms of these key figures to provide a scatter chart of how often sea-states falling within intervals of the key figures, occur within the scope of the wave-climate to be established (monthly, seasonal, annual, or any other period of interest, such as the life time of the absorber). The intervals are sliced to cover the full range of observed sea-states with an appropriate resolution. For example, a commonly used bin size for intervals of the significant wave height Hs is 0.5 meters, and for intervals of the wave energy period Te is 1 second. The occurrence of sea-states and the wave components comprised in these sea-states may be normalised/binned to a pre-determined observation period serving as a time base for the statistical description of the wave climate. A commonly used time base is hourly.

From the wave climate description, characteristic parameters may be derived, for example a prevalent wave height, a prevalent wave period, and/or a prevalent directional spread. The characteristic parameters may relate to a maximum of the distribution with respect to the underlying parameter. Alternatively, the characteristic parameters may be derived from a combination of moments that may be calculated from the distribution, or otherwise derived according to a theoretical model.

The above-mentioned statistical distribution of the sea-states may be scaled with the energy content in the respective intervals of sea-states to obtain a distribution of the available energy over the different sea-states of the wave climate. Using the absorber element, the available energy may be converted into useful energy, wherein the conversion efficiency of a given absorber element depends on the incoming wave. Productivity may be defined as the ratio of useful energy divided by available energy. For a wave energy conversion system producing electrical energy to a grid, the productivity may thus be defined as the energy output delivered to the grid as compared to the available energy. Alternatively, e.g. for the purpose of optimising the absorber element configuration, the productivity may be defined as the energy uptake of the absorber element as compared to the available energy.

Starting with a given absorber element profile, preferably the following dimensions of the absorber element may be specified in order to configure the absorber element for operation in a wave climate of a given deployment site: length, height, pivot axis height, idle draught, and width. Specifying a length and a height implies a certain tip angle. Specifying a tip-angle implies a certain length to height ratio. One of the merits of the present invention is to realize that a wave absorber element of the front pivot type to a large extend can be optimised for operation at a given deployment site merely by configuring the absorber element length and/or the absorber element idle draught according to the deployment site's prevalent wavelength and/or wave height, respectively.

The idle draught may be varied e.g by changing the shape/dimensions of the submerged portion so as to re-distribute the buoyancy providing volume in order to achieve a different draught of the absorber element. For an absorber element of a given shape/dimensioning, the idle draught may be varied by adjusting a ballast carried by the absorber element. A given absorber element is configured for operation in an absorber unit. The configuration comprises determining a value for the front pivot axis height $Fa$ and the idle draught $Fd$. The front pivot axis height $Fa$ and the idle draught $Fd$ determine in combination the angle of operation of the absorber element as e.g. expressed by the front side inclination angle with respect to the water surface, in the idle position and under still water conditions. Typically, the front pivot axis height $Fa$ corresponds to about 5%-30% of the sum of the axis height $Fa$ and the idle draught $Fd$, $(Fa+Fd)$, and preferably $Fa$ is about 10% of $(Fa+Fd)$.

It is noted that the skilled person knows that draught will be dependent on a number of parameters, such as salinity and temperature of the surrounding body of water. The draught may therefore preferably be determined for a set of standardised conditions, such as in freshwater at a temperature of 20 degrees Celsius, or alternatively using the salinity and/or average/prevalent temperature at the given deployment site. The skilled person also knows how to convert a draught value determined for a given set of standardized conditions into a draught value for different conditions.

It is also noted, that the absorber element length and/or the idle draught may be expressed in terms of equivalent dimensioning parameters that for a given absorber element by means of a well-defined relation may be converted into the absorber length and/or the idle draught, respectively. For example, an active length may be defined as the length of the waterline of the absorber element in the idle position. An active height of the absorber element may be defined as a depth of interaction between the absorber element and the body of water, and may be measured as the draught of the absorber element, wherein the idle draught is a special case selected, because it is a convenient parameter for configuration purposes. In combination with a given front side length and front pivot axis height, the idle draught also determines the front side inclination with respect to the body of water. Varying the front side inclination for a given profile affects the interaction between the incoming waves and the pressure surface formed by the front side, thereby affecting the conversion efficiency of the absorber element.

Optimising the idle draught may be performed by deriving from the statistical wave data a characteristic wave height that is representative of the wave climate, and configuring the absorber element idle draught according to the characteristic wave height, so as to maximise the production of useful energy when operating the absorber element in a wave energy conversion system at the given deployment site.

Accordingly, optimising the absorber length may be performed by deriving from the statistical wave data a characteristic wave period that is representative of the wave climate, determining the corresponding characteristic wavelength, and dimensioning the absorber element length according to the characteristic wavelength, so as to maximise the production of useful energy when operating the absorber element in a wave energy conversion system at the given deployment site.

An iterative optimization of the absorber element configuration for a given deployment site may comprise the steps of (a) deriving the energy content distribution for a representative wave climate description of the deployment site in terms of wave height and/or wave period (or corresponding wavelength), (b) for a given absorber element with a specified idle draught and/or length, deriving a conversion efficiency distribution in terms of wave height and/or wave period (or corresponding wavelength), (c) combining the energy content distribution and the conversion efficiency distribution to obtain a productivity distribution for the given absorber element in the given wave climate (if applicable when operated in a given wave energy conversion system)

(d) varying the idle draught and/or length keeping remaining parameters for defining the operational absorber element constant, and (e) repeating the steps (b) through (d) until an optimisation criterion is satisfied.

Multiplying the conversion efficiency distribution of the obtained absorber element with the distribution of the available energy content of the wave climate at the deployment site gives the potential energy production/output power that may be achieved with that absorber element.

An optimisation criterion may be directed to maximising energy production during the period of interest at the given deployment site. An optimisation criterion may also comprise further factors, maximizing, minimizing and/or balancing these factors together with a mere maximisation of energy production. Further factors may comprise construction costs for a system using the absorber element, service friendliness, life-cycle analysis, environmental considerations, etc.

Other parameters defining the absorber element, such as profile shape, width, pivot axis height, and the like, are kept constant for the purpose of optimising the length and draught of the absorber element. However, also any of these parameters may be optimised using the above routine, wherein instead in step (d) the parameters to be optimized are varied keeping remaining parameters constant.

Advantageously, the width of the absorber element is dimensioned according to a dimensionality/directional spread of the waves: the larger the prevalent directional spread, i.e. the directional spread of the wave components comprised in the prevalent sea-states of the wave climate, the narrower the absorber element may be dimensioned. A minimum width of the absorber element to be at least one or a few meters wide may be determined according to practical considerations. On the other hand, if the incoming waves most of the times are predominantly unidirectional, i.e. the wave components comprised in the prevalent sea-states have a narrow directional spread, then the absorber element may be made wider. In the case of low directional spread, but where the direction of the incoming waves varies a lot between different sea-states, the wave energy system is advantageously aligned with the prevalent wave direction of the different sea-states by means of a rotating mooring system.

Advantageously, configuring the absorber element comprises determining a total mass according to a desired net lift force, wherein the net lift force is the difference between the gravitational force acting on the absorber element in a downward direction and the buoyancy force acting in an upward direction. Adjusting the total mass of an absorber element with a given geometry allows adjusting the absorber element operation angle, and thereby the front side inclination angle. Varying the absorber element operation angle/front side inclination influences the conversion efficiency of the absorber element under operation. By adjusting the mass in a configuration phase, the absorber element operation angle/front side inclination may be adapted, and if desired optimised, for the general wave conditions of the wave climate of a given deployment site. The mass of the absorber element may also be adjusted during operation by ballasting means in order to dynamically optimise the absorber element conversion efficiency under varying wave conditions.

Further, according to one embodiment of a method of providing a wave absorber element, the statistical data is an energy content distribution over intervals of wave heights H, preferably significant wave heights Hs, and/or intervals of wave periods, preferably wave energy periods Te, for sea-states at the deployment site.

Further, according to one embodiment of a method of providing a wave absorber element, the one or more characteristic parameters representing the wave climate are associated with a maximum in energy content. When describing the wave energy content distribution in terms of the wave periods and/or the wave heights, the characteristic wave period and the characteristic wave height are the wave period and/or wave height values, where the energy content distribution is a maximum. Selecting the peak positions in the energy content distribution as the characteristic parameters is a simple way of estimating the region of the distribution where most of the available energy is centred.

Further, according to one embodiment of a method of providing a wave absorber element, dimensioning/optimisation is performed on the basis of statistical data in a production window selected from the statistical data representing the wave climate.

The production window is a subset of the statistical data describing the wave climate. Advantageously, the optimisation may be performed within a production window of wave heights and/or wave periods selected from the range of wave heights and/or wave periods covered by the complete wave climate data, thereby disregarding the most improbable/extreme sea-states for the purpose of configuring the absorber element.

Further advantageously, the production window may be selected taking into account energy production cost. The production window may be selected balancing the desire of covering as much of the available energy against the difficulty of designing an efficient absorber element that is responsive over the full range of sea-states contained in the production window: if the same energy content can be achieved with a narrower production window, such a narrower production window may be preferable. Alternatively or in addition thereto, the production window may be selected by balancing energy content against construction cost for the absorber element.

Advantageously, the production window is the smallest possible group of waves that constitute between 85% and 95% of the available wave energy. A requirement of an energy content of about 85%-95% of the total available energy is found to provide a good basis for obtaining an optimised productivity at a reasonable energy production cost.

Further, according to one embodiment of a method of providing a wave absorber element, the idle draught Fd is the characteristic wave height times a height scaling factor D in the range 2-5, preferably in the range 2.2-4, more preferably between 2.5-3.5, or about 2.9. By reaching deep into the body of water, a high fraction of the energy carried by the wave can be exploited, thereby increasing the conversion efficiency of the absorber element. Preferably, the characteristic wave height is the significant wave height, where the energy content of the wave climate is a maximum. Using an idle draught which is scaled with a factor selected from the above sequence of ranges, increasingly improved conversion efficiency is achieved.

Further, according to one embodiment of a method of providing a wave absorber element, the absorber element length Fl is the characteristic wavelength times a length scaling factor L in the range 0.1-0.4, alternatively in the range 0.11-0.25, alternatively in the range 0.12-0.20, or about 0.15. Preferably, the characteristic wavelength is the wavelength associated with the peak wave period where the energy content of the wave climate is a maximum. Using an absorber element length which is scaled with a factor selected from the above sequence of ranges, increasingly improved conversion efficiency is achieved.

Further, according to one embodiment of a method of providing a wave absorber element, the length of the absorber element and/or the idle draught Fd of the absorber element is reduced so as to optimise productivity for conversion of available wave energy to useful energy with respect to cost.

Reducing the dimension allows reducing cost for construction and operation of the absorber element. A reduction in size of the absorber element also entails a reduction in size, and thereby cost, of a wave energy conversion system comprising the absorber element. Dimensions may thus be reduced so as to balance absorber element construction cost against energy production efficiency, thereby minimising the overall cost for the production of useful energy. In particular if the maximum in productivity with respect to the length and/or height is relatively flat, a decrease in construction cost may be bought at the expense of a relatively small decrease in productivity, thereby reducing the overall cost of energy production.

Further, according to one embodiment of a method of providing a wave absorber element, the configuration further comprises the step of dimensioning a height Fh of the absorber element to be larger than the idle draught Fd such that the upper rear edge in the idle position of the absorber element is above still water level.

Preferably, the height of the absorber element body height is configured such, that the top side/upper rear edge of the absorber does not submerge during operation. Thereby, counterproductive resistance to the motion of the absorber element as well as undesired wave generation in the wake of the absorber element is avoided.

Based on a fluid static analysis, the absorber element body height may be configured such that the upper rear edge in the idle position of the absorber element is above still water level, i.e. such that an upper portion of the rear edge projects out of the water. Typically, the absorber element height is chosen to be approximately the sum of pivot axis height and idle draught.

Further according to one embodiment of a method of providing a wave absorber element the configuration further comprises the steps of performing a motion analysis on the absorber element under the influence of irregular wave fields representative of the wave climate, and determining a height of the absorber element Fh so as to prevent submerging of the upper rear edge during operation of the absorber element in the wave climate.

As mentioned above, the height of the absorber element body height is preferably configured such, that the top side/upper rear edge of the absorber does not submerge during operation in order to avoid losses.

Alternatively or in combination with the above-mentioned fluid static analysis, an absorber element height may be configured based on a motion analysis. In this approach, the absorber element height may be determined iteratively starting with a motion analysis for a given absorber element profile in a representative wave field, preferably taking operational loads and/or load variations into account. The height of the starting profile may e.g. be the fluid statically determined absorber element height. A motion analysis may include observations on full scale absorber elements, motion data from model experiments and/or computer simulations, such as CFD-based calculations. The motion analysis may use statistical wave distribution data representative of the wave climate at a given deployment site as input to an experimental and/or computational analysis. In case the motion analysis determines a critical submersion that may affect wave energy absorption efficiency, the height of the absorber element is increased accordingly. The iterative process may be repeated for the thus obtained absorber element profile until satisfactory absorption performance is verified.

An excessive height of the absorber element profile is preferably avoided in order to reduce construction/installation cost, and to avoid undesired interaction of the absorber element with wind.

Advantageously, an absorber unit for the absorption of wave energy from a body of water comprises an absorber element according to any of the above-mentioned embodiments, the absorber unit further comprising a frame structure suspending the absorber element from the front axis at a predetermined axis height Fa above still water, wherein the frame structure is configured to essentially stay at rest with respect to the average level of the body of water. To a good approximation, the reference of the still water level may be mapped to a level on the frame structure of the absorber unit, which frame structure level may thus be taken as an equivalent reference for the configuration and/or operation of the absorber element.

The axis height is sustained by a frame structure, which is essentially immobile with respect to the body of water, essentially unaffected by the incoming waves. The axis height may be determined to reduce wave impact yet improving absorption efficiency, wherein advantageous values for the axis height are in the range about 5%-30% of the sum of the axis height Fa and the idle draught Fd, (Fa+Fd), as mentioned above.

Wave energy is exploited by power take-off means harnessing the motion of the absorber element with respect to the frame structure. Typically, the frame structure is part of an offshore floating platform, which is moored using a rotating mooring system allowing the absorption unit to be oriented such that the front end of the absorber element faces towards the incoming waves. Furthermore, the floating platform is typically configured and dimensioned so as to rest in the body of water when assuming a given wave climate. To that end, active and passive stabilizing means may be provided on the platform. A plurality of absorber units, each comprising a front pivot absorber element, may be combined in the same platform.

Alternatively, in particular for locations close to a shore with low sea depth, the frame structure may also be supported from a foundation fixed to the sea floor. Furthermore, a combination of floating modules anchored between fixed foundations may be conceived.

Advantageously, an absorber element/unit according to any of the above mentioned embodiments may be used for driving a hydraulic power take-off system and/or means for direct energy conversion in a wave energy plant for converting wave energy into electrical energy.

Advantageously, an absorber element/unit according to any of the above mentioned embodiments may be used as an open wave breaker. The absorption element/unit according to the invention may have a surprisingly high absorption efficiency of up to 70% or even more. The energy contained by the outgoing waves aft of the absorber element/unit may thus be effectively reduced as compared to incoming waves. At the same time, such a wave breaker system is open for fluid communication and the exchange of marine life, while on the leeward side providing coastal protection, protecting marine structures/installations, such as wind farms or fish farms, protecting spawning areas, or the like. Thereby, the environmental impact of the wave breaker is minimised while providing an efficient protection against waves. Further advantageously, a plurality of absorber elements/units is arranged in parallel and next to each other along a protection line. Furthermore, a plurality of absorber elements/units may be cascaded in series in order to increase the total wave absorption and improve the protection. In a cascaded arrangement, the downstream absorber elements should be dimensioned smaller than the upstream absorber elements, in order to account for the reduced size of the waves aft of the upstream absorber elements/units. Further advantageously, the absorber elements/units of the open wave breaker are used for driving power take-off means for producing useful energy from the motion of the absorber elements with respect to the frame structure supporting them.

BRIEF DESCRIPTION OF THE DRAWINGS

In the following, the invention is further explained with reference to the drawings. The drawings show in FIG. 1 A cross-sectional view of an absorber element according to one embodiment, FIG. 2 schematically, geometrical parameters of the absorber element of FIG. 1 under operational conditions, FIG. 3 a top elevational view of the absorber element of FIG. 1, and FIG. 4 a side elevational view of the absorber element of FIG. 1.

DETAILED DESCRIPTION OF THE INVENTION

Figure 1:
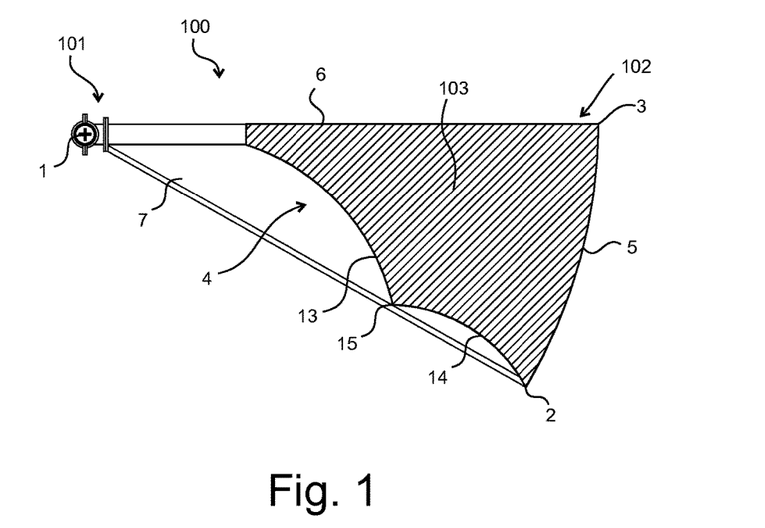
Figure 2:
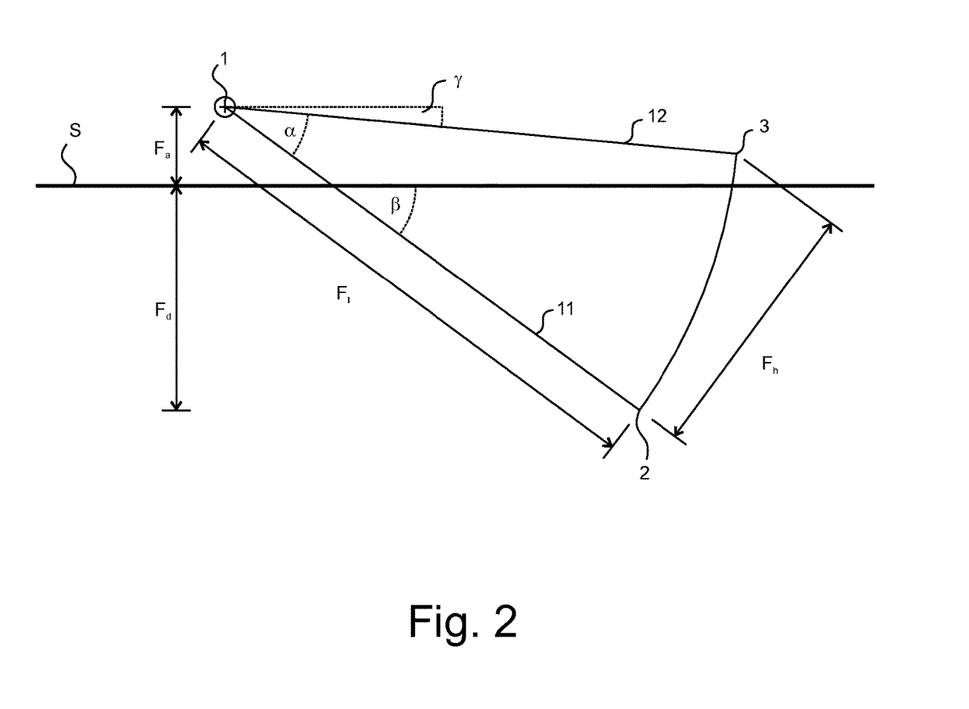
Figure 3:
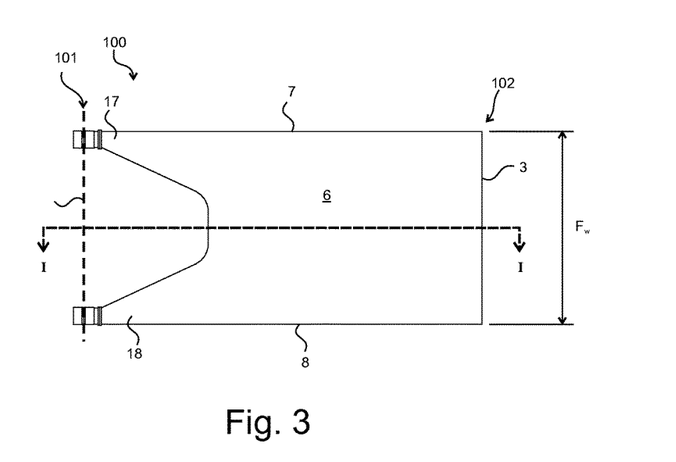
Figure 4:
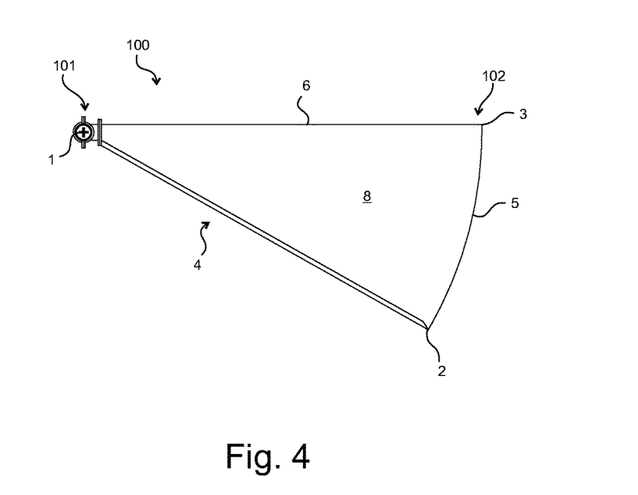

Referring to FIGS. 1-4, an embodiment of the absorber element is described. FIG. 1 shows a cross-sectional view along line I-I as indicated in FIG. 3; FIG. 2 illustrates geometrical parameters of the absorber element under operation; and FIGS. 3 and 4 show top and side elevational views, respectively. The absorber element 100 has a front end 101 comprising a front pivot axis 1 around which the absorber element 100 swings up and down under the influence of incoming waves travelling in the direction W from the front end to a rear end 102 of the absorber element 100. An absorber element body 103 is defined by a front side 4 extending from the front end 101 to a lower rear edge 2 at the rear end 102, a rear side 5 extending from an upper rear edge 3 at the rear end 102 to the lower rear edge 2, a top side 6 extending from the front end 101 to the upper rear edge 3, and lateral sidewalls 7, 8 defining the width Fw of the absorber body 103 in an axial direction parallel to the front pivot axis 1. The lower rear edge 2 is located in a first radial direction 11 at a first distance from the pivot axis 1, the upper rear edge 3 is located in a second radial direction 12 at a second distance from the pivot axis 1, and the first and second radial directions 11, 12 define an acute tip angle α of the absorber element 100. The first distance defines the absorber element length Fl, and the distance of the upper rear edge 3 from the first radial direction 12 defines the absorber element height Fh. The embodiment shown in FIG. 1 has a length to height ratio Fh/Fl of about 2 and a tip angle α of about 30 degrees.

The cross-sectional view of FIG. 1 shows the profile of the absorber element 100 in a cut-plane I-I perpendicular to the front pivot axis 1, wherein the absorber element profile comprises a profile of the absorber element body 103 and the front pivot axis 1. The profile of the absorber element body 103 is shown as the hatched area in FIG. 1. Seen in a direction from the front end 101 to the rear end 102, the absorber element profile comprises at the front side 4 a concave portion with two concave sub-portions 13, 14 separated by a ridge 15. A convex envelope to the absorber element profile in the cut plane I-I may be considered as a rubber band stretched around the absorber element to enclose the front pivot axis and the profile of the absorber element body 103. A front side portion of the convex envelope to the absorber element profile is a straight line extending from the front end 102 to the lower rear edge 2.

The sidewalls 7, 8 essentially follow the convex envelope, and provide additional stiffness to the absorber element, in particular for absorber elements with considerable concave portions at the front side. Optional interstitial walls (not shown) that may be arranged in between and essentially parallel to the sidewalls 7, 8 may further increase the stiffness of the absorber element 100.

For operation, the absorber element 100 is pivotally supported from the front pivot axis 1 arranged at a pivot axis height Fa above the average surface of the body of water equal to the level S of the surface under still water conditions. The absorber element is configured such that the rear end 102 is partially submerged, wherein the lower rear edge 2 is under water and the upper rear edge 3 is above water. When suspended at the axis height Fa above the water surface S in an idle position under still water conditions, the lower rear end 2 is located beneath the water surface S at a depth Fd defining the idle draught of the absorber element 100.

An absorber element pitch may be defined as the front side inclination measured as the angle β the first direction encloses with the horizontal. Alternatively, an operation angle γ of the absorber element may be defined as the angle between the surface S and the second direction 12, wherein operation angles γ where the upper rear edge is below the front pivot axis are defined as negative.

The rear side 5 of the absorber element profile essentially follows a circular arc around the front pivot axis 1 with a radius equal to the absorber element length Fl. Consequently, the first distance of the lower rear edge 2 and the second distance of the upper rear edge 3 from the front pivot axis are equal to each other and equal to the absorber element length Fl. Under operation, the circular shape avoids that the rear surface 5 excites waves in the wake of the absorber element 100 as it moves up and down in the water.

The absorber element body comprises arms 17, 18 connecting the buoyancy portion of the body to the pivot axis 1. The buoyancy portion may comprise ballasting means, such as one or more hollow interior spaces (not shown) that may be filled with e.g. water, wherein the ballasting means may comprise inlet and outlet openings and pressurising means allowing the absorber element mass to be adjusted during operation.

The absorber element may further be provided with means for coupling power take-off means to the absorber element (not shown), and/or further accessories (not shown) attached to the outside of the absorber element, such as brackets for use with a limit stop for limiting the angular span of the absorber element motion.

Figure 5:
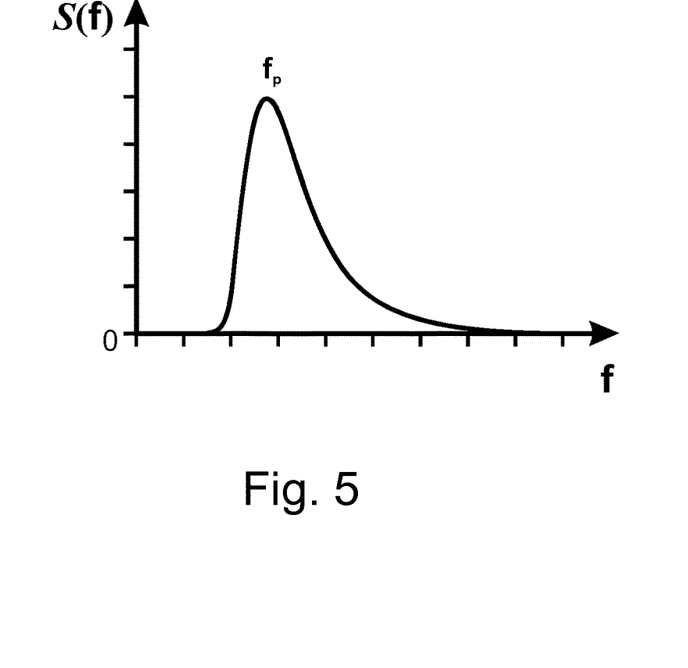
FIG. 5 an example of a wave spectrum.

Advantageously, an absorber element is configured for operation at a given deployment site with a given wave climate by dimensioning the absorber element according to these characteristic parameters. When operating the absorber element in a given sea-state, the absorber element is exposed to a wave-train of irregular waves, which is incident from the front-end and drives the reciprocating motion of the absorber element. A given sea-state of irregular waves may be described as a superposition of sinusoidal waves of different frequencies, phases, amplitudes and directions. The energy content of a sea-state may thus be described by a wave spectrum S(f), i.e. a frequency dependent energy distribution S(f). To a good approximation, the shape of a wave spectrum may be described by a model well-known in the field of wave science, such as a PM-spectrum (Pierson-Moscowitz), or a JONSWAP-spectrum (Joint North Sea Wave Program). A possible wave spectrum is illustrated in FIG. 5. The spectrum of the irregular sea-state may be represented by key figures derived from the moments of the spectral distribution S(f), as discussed above. These key figures comprise the significant wave height Hs, the wave energy period Te, the average wave period Tz, and the peak wave period Tp, wherein wave periods T are the inverse of the corresponding wave frequency f: T=1/f.

In order to determine the wave climate at a given location, wave data are gathered over a longer period of time, wherein several sources may be combined to obtain a useful set of wave data. The wave climate thus comprises an ensemble of sea-states occurring within said longer period of time, wherein the sea-states may be defined as wave data gathered within a predetermined observation period serving as a time base for the statistical description of the wave climate. A commonly used time base is hourly. The wave climate may thus be represented as a time based statistical distribution of how often certain sea-states occur. The occurrence of the sea-states may be analysed in terms of key figures to provide a scatter chart of the wave climate. Depending on the application, the time period scope for such a representation of the wave climate may be monthly, seasonal, annual, or any other time period of interest, such as the life time of the absorber. The statistical distribution may further be scaled/weighted by the energy content of the different sea-states. From the wave climate description, characteristic parameters may be derived that characterise the statistical distribution of waves occurring throughout the time period of the wave climate, such as the wave height and/or the wave period for which the overall energy content is a maximum.

Example

Referring to FIGS. 6-9 in the following, configuration of an absorber element is described by way of example for a given deployment site, wherein the configuration is performed for a pre-determined shape of the absorber element profile. Configuring of the absorber element for operation in the wave climate of the deployment site essentially amounts to determining the wave climate at the specific site and dimensioning the absorber element accordingly so as to ensure an efficient harvesting of the available wave energy at a commercially viable cost level.

Figure 6:
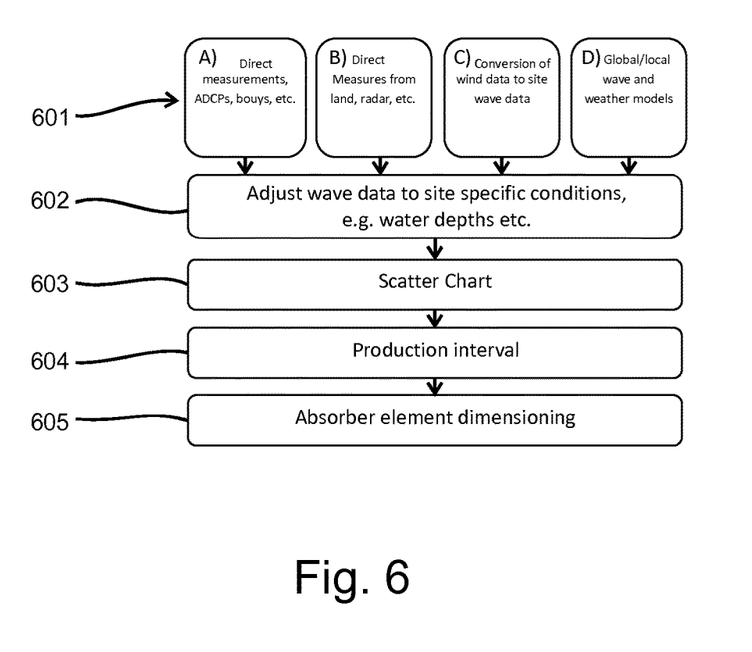
FIG. 6 a diagrammatic representation of a method for configuring an absorber element, FIG. 7 a scatter chart of sea state distribution, FIG. 8 a scatter chart of the energy content distribution, and FIG. 9 a graph comparing the performance of absorber elements with different dimensions.
Figure 7:
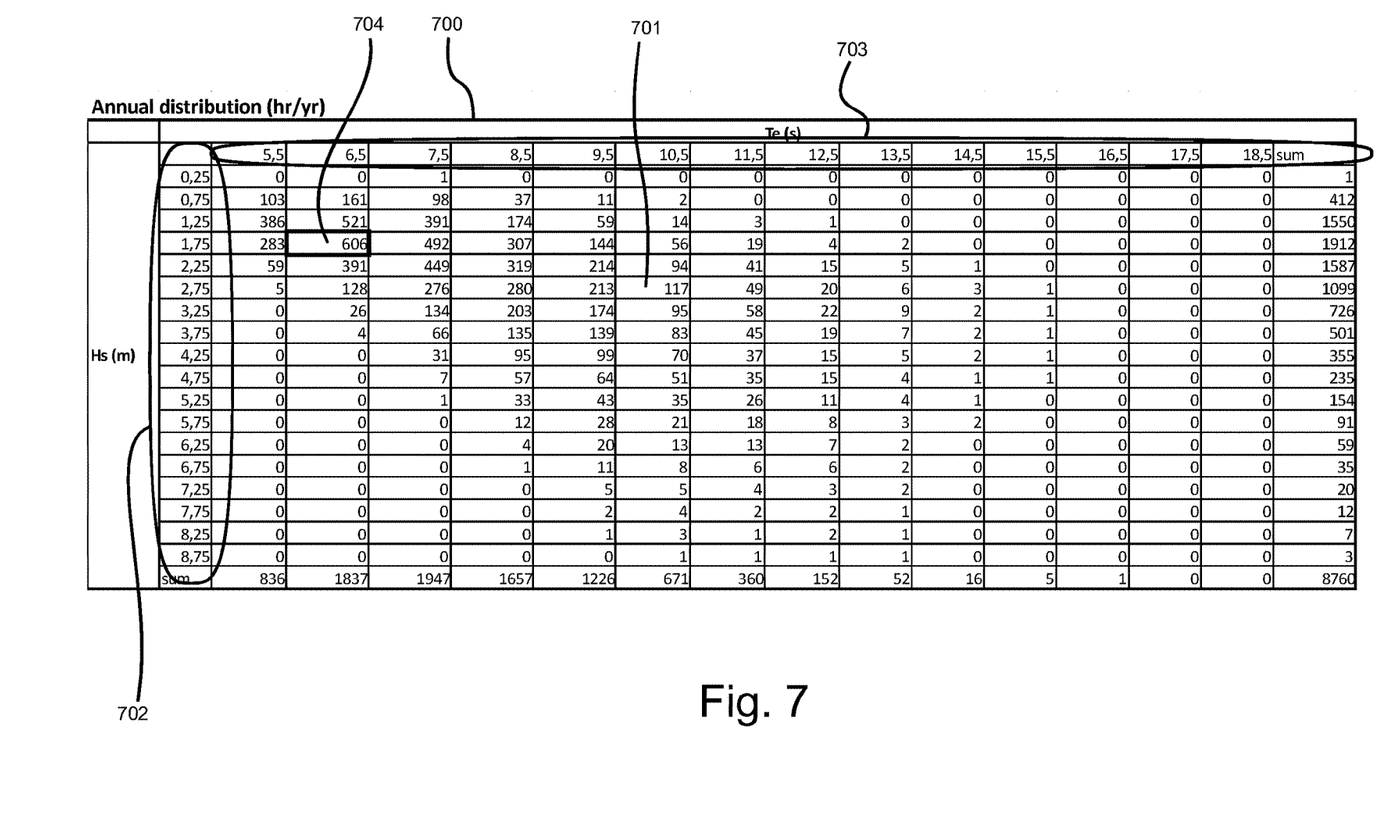

FIG. 6 illustrates the steps performed. Note that the steps related to determining the wave climate may have been performed beforehand, and may at least partially be available from archives. Wave climate data may include the monthly, seasonal and annual statistics of wave power as well as a consideration of the variability of wave power on monthly, seasonal, annual and inter-annual timescales. Gathering wave data is quite complex and expensive. Therefore several sources are often combined (601 A-601 D). The wave data are, if necessary/possible, adjusted to the specific characteristics of the deployment site (602). This creates a pool of wave climate date for the specific deployment site. The site specific wave data is then transformed into a wave scatter diagram 700 with the purpose of providing a time based statistical description of the sea states in terms of the wave heights and periods, more specific the distribution of significant wave heights Hs, the wave energy period Te, and optionally the wave directions/directional spread (not shown) of the sea-states for the entire lifetime of the project, distributed on an hourly basis (603). After having obtained a suitable representation of the wave climate, preferably within a production window selected to disregard the most extreme sea-states (604), the absorber element is dimensioned accordingly (605).

FIG. 7 shows a scatter chart 700 describing the wave climate of a given deployment site. The scatter chart 700 is subdivided into cells 701 defined by intervals 702, 703 of the significant wave height Hs and the wave energy period Te, here labelled by their centre value in units of meters and seconds, respectively. Sea states falling within the (Hs, Te)-intervals of a cell 701 are counted in this cell 701. Considering a time period of one year and a time base of one hour, scatter chart 700 shows the hourly distribution of the occurrence of sea-states throughout a year.

The distribution of sea states may then be scaled/weighted by an optimisation parameter, which in the present example is the energy content of the (Hs, Te) cells. Preferably, for the purpose of dimensioning, a production window is chosen. Depending on site specific variations the production window is the smallest possible group of sea-states that constitutes typically between 85%-95% of the available wave energy. In practice, this means the smallest, shortest, longest and highest waves are disregarded from a dimensioning point of view.

Figure 8:
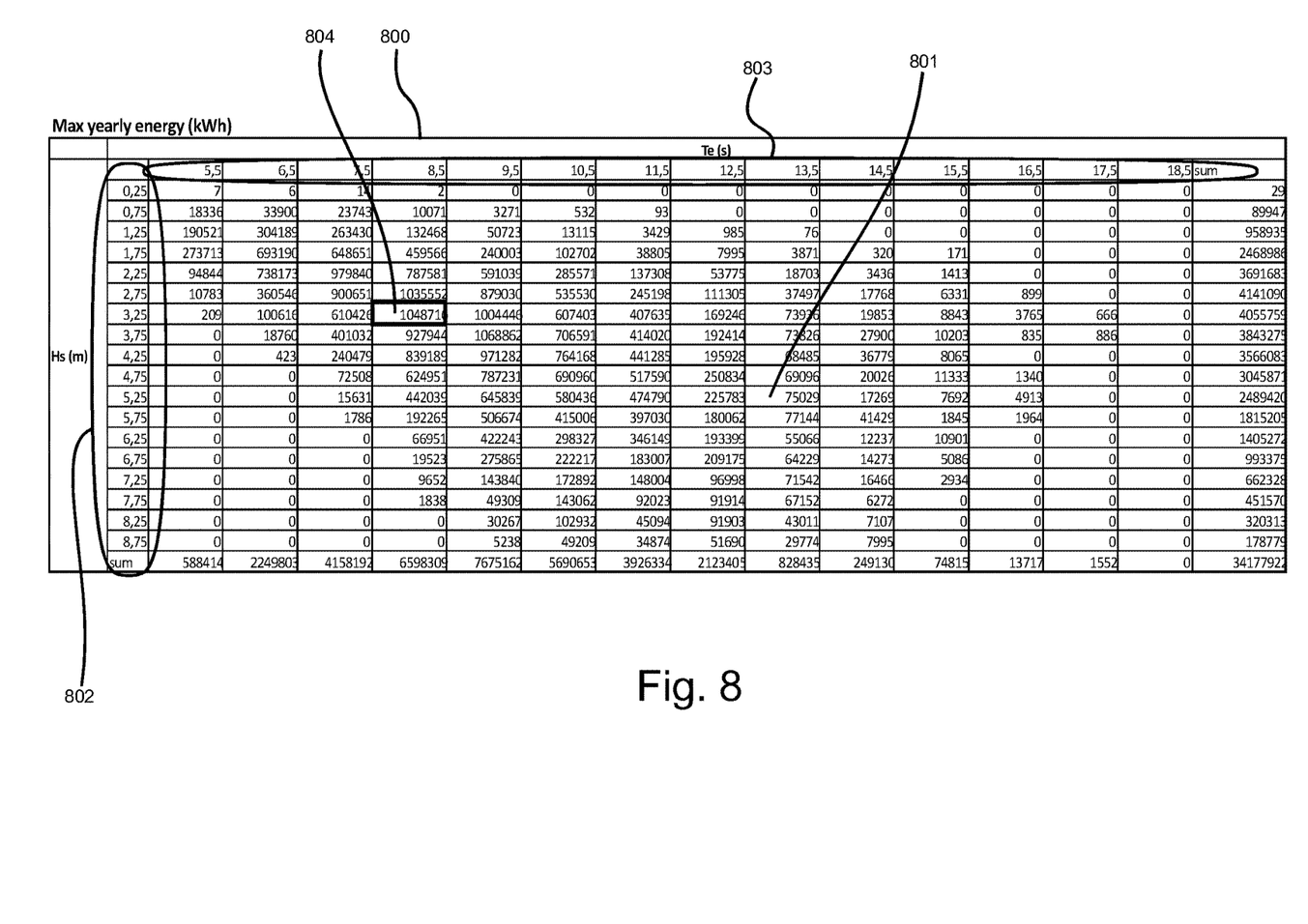

The yearly hourly distribution of the available wave energy is corresponding to the scatter chart 700 of occurrences of sea states is shown in FIG. 8. The distribution of the available energy is obtained in the form of an energy content scatter chart 800 by calculating the wave energy content in each (Hs, Te) cell and multiplying with the number of occurrences of sea-states within this cell. The (Hs, Te) intervals 802, 803 defining the cells 801 of the energy content scatter chart 800 correspond to the intervals 702, 703 of the sea-state distribution chart 700. Note that the re-scaling with the optimization parameter shifts the position of the cell 804 with maximum energy content with respect to the position of cell 704 with the most frequent sea-states. The significant wave height Hs(peak) and the wave energy period Te(peak) characterizing the position of the cell 804 with peak energy content is then used as the characterizing parameters of the wave climate at the deployment site for the purpose of dimensioning the absorber element. The peak position values are Hs=3.25 m, and Te=8.5 s.

Figure 9:
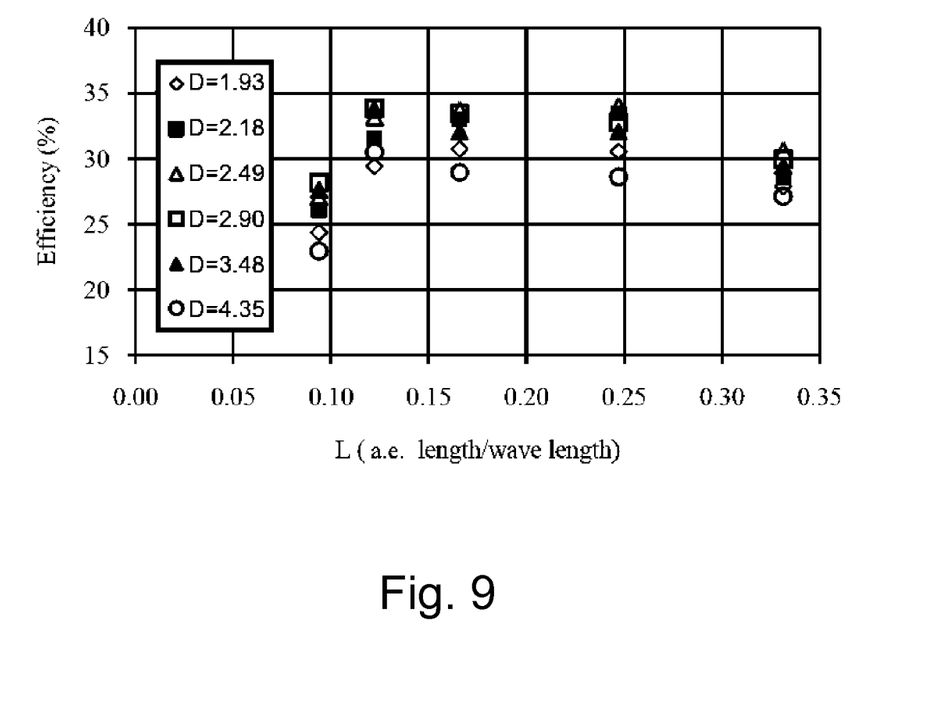

As mentioned above, the idle draught Fd may be scaled according to a characteristic wave height of the wave climate using a height scaling factor D, wherein the characteristic wave height is preferably a significant wave height where the energy content of the wave climate is a maximum. Also, the absorber element length Fl may be scaled according to a characteristic wavelength of the wave climate using a length scaling factor L, wherein the characteristic wavelength is preferably a wavelength corresponding to a peak wave period Tp where the energy content of the wave climate is a maximum. Tests have shown that an advantageous height scaling factor D is in the range 2-5, preferably in the range 2.2-4, more preferably between 2.5-3.5, or about 2.9, and an advantageous length scaling factor L is in the range 0.1-0.4, alternatively in the range 0.11-0.25, alternatively in the range 0.12-0.20, or about 0.15. By way of example, FIG. 9 shows test results for the conversion efficiency of a given wave energy conversion system as a function of the absorber element length and for a number of different absorber element heights. For the sake of comparison, the data is normalized, wherein the absorber element length is expressed by the dimensionless length scaling factor L, and the absorber element height is expressed by the dimensionless height scaling factor D. The length scaling factor L is normalized with respect to the wavelength corresponding to the key figure Tp, and the height scaling factor D is normalized with respect to the significant wave height Hs. Approximately in the above case, $T_p=1.17\, T_e$ and the corresponding wavelength $\lambda p$ is to a good approximation equal to $$\lambda_p = \frac{gT_p^2}{2\pi}.$$

Using a length scaling factor of L=0.15, the absorber element length is advantageously configured to $$F_l = 0,15\frac{g(1,17T_e)^2}{2\pi} = 23,2 \text{ m.}$$

Accordingly, a preferred idle draught is determined as $F_d = 2.9 \cdot 3.25$ m = 9.4 m.

The values obtained by an optimisation of the absorber element dimensions with respect to energy conversion efficiency may be balanced against the construction costs that are increasing with increasing size of the absorber element, wherein trading a slight decrease in conversion efficiency for a substantial decrease in construction cost reduces the total cost of energy production. Construction cost or similar considerations may already be implemented in the optimisation parameter for weighting the sea-state distribution. Alternatively, a correction of the dimensions may be performed after determining the absorber element dimensions for maximum conversion efficiency.

The invention claimed is:

1. Wave absorber unit comprising an absorber element for the absorption of wave energy from a body of water, the absorber element having
   a front end comprising a front pivot axis, and
   an absorber element body being defined by a front side extending from the front end to a lower rear edge, a rear side extending from an upper rear edge to the lower rear edge, a top side extending from the front end to the upper rear edge, and lateral sidewalls defining the width of the absorber body in an axial direction parallel to the front pivot axis, wherein the lower rear edge is located in a first radial direction at a first distance from the pivot axis, and the upper rear edge is located in a second radial direction at a second distance from the pivot axis, wherein the first and second radial directions define an acute tip angle of the absorber element, wherein the first distance defines the absorber element length, and the distance of the upper rear edge from the first radial direction defines the absorber element height, the absorber element having a cross-sectional profile as seen in a cut-plane perpendicular to the front pivot axis, wherein said absorber element profile encloses a profile of the absorber element body and the front pivot axis,
   the absorber unit further comprising
   a frame pivotally supporting the absorber element from the front pivot axis, wherein in an idle position the front pivot axis is located at a predetermined front pivot axis height above still water, and the absorber element is partially submerged with an idle draught, wherein the frame is configured to stay at rest with respect to an average level of the body of water,
   wherein the absorber element profile at the front side as seen in a direction from the front end to the rear end bulges inwardly and away from the first direction to form a concave pressure surface for capturing the incoming waves.

2. Absorber unit according to claim 1, wherein a cross-sectional area of the absorber element profile is reduced as compared to the area enclosed by a convex envelope to the absorber element profile, wherein the difference in area is at least 10%, said difference being attributed to the front side of the absorber element profile deviating from the convex envelope.

3. Absorber unit according to claim 1, wherein the concave portion at the front side of the profile comprises at least two adjacent concave sub-portions separated by a ridge.

4. Absorber unit according to claim 3, wherein one or more, preferably all, of the concave sub-portions follow circular arcs.

5. Absorber unit according to claim 1, wherein the rear side portion of the profile follows a circular arc around the front pivot axis.

6. Absorber unit according to claim 1, wherein the absorber element length is in the range from 5-50 m.

7. Absorber unit according to claim 1, wherein the minimum absorber element height is between 2 m and 4 m, and wherein the maximum absorber element height is between 10 m and 30 m.

8. Absorber unit according to claim 1, wherein the tip angle is between 10-70 degrees.

9. Method of providing an absorber unit according to claim 1, the method comprising configuring the absorber element for operation in a wave climate at a given deployment site, the configuration comprising the steps of
   obtaining statistical wave data describing the wave climate of the deployment site,
   deriving from the statistical wave data one or more characteristic parameters that are representative of the wave climate,
   dimensioning the absorber element according to the one or more characteristic parameters.

10. Method according to claim 9, further comprising the step of optimising productivity of the conversion of available energy to useful energy by
    selecting an optimised dimension where the production of useful energy during a period of interest is a maximum when operating the absorber unit in a wave energy conversion system during the period of interest in the wave climate of the deployment site.

11. Method according to claim 10, wherein the selecting an optimised dimension is performed iteratively by
    (a) deriving an energy content distribution for a wave climate description of the deployment site in terms of the one or more characteristic parameters,
    (b) for a given absorber element with a specified dimensioning, deriving a conversion efficiency distribution in terms of the one or more characteristic parameters,
    (c) combining the energy content distribution and the conversion efficiency distribution to obtain a productivity distribution for the given absorber element in the given wave climate,
    (d) varying the dimensioning keeping remaining parameters for defining the operational absorber element constant, and
    (e) repeating the steps (b) through (d) until energy production during the period of interest at the given deployment site is a maximum.

12. Method according to claim 10, wherein the dimension of the absorber element is reduced so as to balance absorber element construction cost against energy production efficiency, thereby reducing the overall cost of energy production.

13. Method according to claim 10, wherein selecting an optimized dimension includes selecting an optimized idle draught.

14. Method according to claim 13, wherein selecting an optimized idle draught includes:
    (a) deriving an energy content distribution for a wave climate description of the deployment site in terms of wave height,
    (b) for a given absorber element with a specified idle draught, deriving a conversion efficiency distribution in terms of wave height, (c) combining the energy content distribution and the conversion efficiency distribution to obtain a productivity distribution for the given absorber element in the given wave climate,
(d) varying the idle draught keeping remaining parameters for defining the operational absorber element constant, and
(e) repeating the steps (b) through (d) until energy production during the period of interest at the given deployment site is a maximum.

15. Method according to claim 10, wherein selecting an optimized dimension includes selecting an optimized absorber length.

16. Method according to claim 15, wherein selecting an optimized absorber length includes:
(a) deriving an energy content distribution for a wave climate description of the deployment site in terms of wave period,
(b) for a given absorber element with a specified absorber length, deriving a conversion efficiency distribution in terms of wave period,
(c) combining the energy content distribution and the conversion efficiency distribution to obtain a productivity distribution for the given absorber element in the given wave climate,
(d) varying the absorber length keeping remaining parameters for defining the operational absorber element constant, and
(e) repeating the steps (b) through (d) until energy production during the period of interest at the given deployment site is a maximum.

17. Method according to claim 9, wherein the statistical data is an energy content distribution over intervals of one or more parameters selected from the group of wave heights, significant wave heights, wave periods, and wave energy periods, for sea-states at the deployment site.

18. Method according to claim 17, wherein the one or more characteristic parameters representing the wave climate are associated with a maximum in energy content.

19. Method according to claim 9, wherein dimensioning/optimisation is performed on the basis of statistical data in a production window selected from the statistical data representing the wave climate.

20. Method according to claim 9, the configuration further comprising the step of
dimensioning a height of the absorber element to be larger than the idle draught such that the upper rear edge in the idle position of the absorber element is above still water level.

21. Method according to claim 9, the configuration further comprising the steps of
performing a motion analysis on the absorber element under the influence of irregular wave fields representative of the wave climate, and
determining a height of the absorber element so as to prevent submerging of the upper rear edge during operation of the absorber element in the wave climate.

22. Method according to claim 9, wherein the characteristic parameters comprise a characteristic wave height.

23. Method according to claim 22, wherein an idle draught of the absorber element is dimensioned to be larger than the characteristic wave height, said idle draught being defined under still water conditions as the depth of submersion of the lower rear edge below still water level when pivotally suspending the absorber element from the front axis at a predetermined axis height above said still water level.

24. Method according to claim 23, wherein the idle draught is the characteristic wave height times a height scaling factor in the range 2-5.

25. Method according to claim 9, wherein the characteristic parameters comprise a characteristic wave period.

26. Method according to claim 25, wherein an absorber length of the absorber element is chosen to be smaller than a characteristic wavelength corresponding to the characteristic wave period.

27. Method according to claim 26, wherein the absorber element length is the characteristic wavelength times a length scaling factor in the range 0.1-0.4.

28. Use of an absorber unit according to claim 1, in an open wave breaker.

29. Wave absorber unit according to claim 1, further comprising a power-take-off device arranged for harnessing a motion of the absorber element with respect to the frame structure.

30. Offshore floating platform comprising one or more wave absorber units according to claim 1.

31. Offshore floating platform according to claim 30, wherein the floating platform is configured and dimensioned so as to rest in the body of water when assuming a given wave climate.

32. Offshore floating platform according to claim 31, wherein the floating platform further comprises stabilizing means.

* * * * *